(12) United States Patent
Mukkara (10) Patent No.: US 8,738,897 B2
(45) Date of Patent: May 27, 2014

(54) SINGLE SIGN-ON FUNCTIONALITY FOR SECURE COMMUNICATIONS OVER INSECURE NETWORKS

(75) Inventor: Prakash Umasankar Mukkara, Karnataka (IN)

(73) Assignee: Apple Inc., Cupertino, CA (US)

( * ) Notice: Subject to any disclaimer, the term of this patent is extended or adjusted under 35 U.S.C. 154(b) by 939 days.

(21) Appl. No.: 11/974,351

(22) Filed: Oct. 12, 2007

(65) Prior Publication Data

US 2008/0271129 A1 Oct. 30, 2008

(30) Foreign Application Priority Data

Apr. 25, 2007 (IN) .............................. 916/DEL/2007

(51) Int. Cl.
*H04L 29/06* (2006.01)
(52) U.S. Cl.
USPC .............................. 713/155; 713/168; 726/15
(58) Field of Classification Search
None
See application file for complete search history.

(56) References Cited

U.S. PATENT DOCUMENTS

| 6,088,451 | A | * | 7/2000 | He et al. ............................ 726/8 |
| 6,092,200 | A | | 7/2000 | Muniyappa et al. |
| 6,898,711 | B1 | * | 5/2005 | Bauman et al. ............... 713/185 |
| 2002/0178355 | A1 | | 11/2002 | D'Sa et al. |
| 2003/0182551 | A1 | * | 9/2003 | Frantz et al. .................. 713/170 |
| 2003/0188193 | A1 | * | 10/2003 | Venkataramappa .......... 713/201 |
| 2004/0225895 | A1 | | 11/2004 | Mukherjee et al. |
| 2005/0144463 | A1 | | 6/2005 | Rossebo et al. |
| 2005/0154887 | A1 | | 7/2005 | Birk et al. |
| 2006/0112420 | A1 | | 5/2006 | Challener et al. |
| 2006/0225130 | A1 | * | 10/2006 | Chen et al. ........................ 726/5 |
| 2007/0192842 | A1 | * | 8/2007 | Beaulieu et al. .................. 726/9 |

* cited by examiner

*Primary Examiner* — Izunna Okeke
(74) *Attorney, Agent, or Firm* — Blakely, Sokoloff, Taylor & Zafman LLP (57) ABSTRACT

Techniques for identity techniques for single sign-on functionality for secure communications over insecure networks are provided. A principal achieves single sign-on access to a server via a client by initially authenticating to third-party authentication service. Next, a credentialing service supplies a randomly generated credential to the client and the server unbeknownst to the principal. The principal is then equipped to engage in secure communicates over an insecure network using the credential that is managed by services of the client to authenticate to services of the server in a fashion that the principal is unaware of.

10 Claims, 5 Drawing Sheets

SINGLE SIGN-ON FUNCTIONALITY FOR SECURE COMMUNICATIONS OVER INSECURE NETWORKS

RELATED APPLICATIONS

The present application claims priority to India Patent Application No. 916/DEL/2007 filed in the India Patent Office on Apr. 25, 2007 and entitled "SINGLE SIGN-ON FUNCTIONALITY FOR SECURE COMMUNICATIONS OVER INSECURE NETWORKS;" the disclosure of which is incorporated by reference herein.

FIELD

The invention relates generally to security and more particularly to techniques for achieving single sign-on functionality for secure communications over insecure networks.

BACKGROUND

Increasing the affairs of individuals and enterprises are being conducted in an automated manner over the Internet. Enterprises now engage in selling their products and services over the Internet; individuals also engage in communicating with one another over the Internet; employees may also engage in accessing secure resources of their employers over the Internet, etc.

One ever present and daunting issue with this activity is Internet security. Some transactions may be innocuous and may not require any substantial security. However, a growing number of transactions do involve sensitive material associated with enterprises and individuals, such as corporate secrets, personal data, etc. A variety of security mechanisms exist to address this issue.

For example, some enterprises may install dedicated connections for secure communications between parties. Yet, this approach is less pervasive with the advent of Virtual Private Network (VPN) techniques. A VPN permits an insecure connection to be used to achieve secure communications between parties engaged in a transaction.

VPN transactions use authentication and encryption techniques to ensure communications are secure. Yet, in some situations the authenticating mechanism may not reside within the environment of the parties actually engaged in the VPN transactions. In fact, this is increasingly becoming the case as more and more security services are provided by third-party vendors. In such a situation, it becomes difficult to identify the proper VPN sessions between the parties. Thus, to address this issue a party's credentials may have to be regularly acquired from that party to keep a VPN session properly alive. This is not user friendly, is annoying to the user, and is inefficient. However, the perceived alternative is a breach in security or a loss of VPN connectivity; therefore, this remains the typical situation.

Consequently, there is a need for improved single sign-on capabilities with secure communications, such as VPN communications.

SUMMARY

In various embodiments, techniques for single sign-on functionality for secure communications over insecure networks are provided. In an embodiment, a request is received for a communication credential. The communication credential is generated in response to the request. Next, the communication credential is supplied to both a client and a server for the client to use on behalf of a principal for purposes of authenticating the principal for secure communications between the client and the server over an insecure network connection. The principal has previously authenticated once and the principal is unaware of subsequent and multiple authentications being achieved between the client and the server using the communication credential on behalf of the principal.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output. Additionally, a "principal" is a type of resource that actively interacts with other resources. So, a principal may be a user or an automated service.

A "client" is an environment having one or more machines that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection, such as a wide-area network (WAN) and insecure public communications network such as the Internet. Both a client and a server may be viewed as types of resources similar to what was described above with reference to the principal.

In some embodiments, the client as used herein is a Secure Sockets Layer (SSL) Virtual Private Network (VPN) (referred to herein as a SSL VPN client and the server is a SSL VPN server. This permits two-tiers or dual authentication one within a browser of a user and the other with the SSL VPN client that interacts with the browser.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a network. For example, several computers connected via a local area network (LAN) may collectively be viewed as a processing environment. The processing environment also refers to software configurations of the physical processing devices, such as but not limited to operating system, file system, directory service, etc.

According to an embodiment, an authentication service is a service or application that is trusted and communicates securely with resources, such as principals, clients, servers, etc. The authentication service provides single sign-on authentication for principals, as described more completely herein and below. In an embodiment, the authentication is an identity service, which refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

Some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

Figure 1:
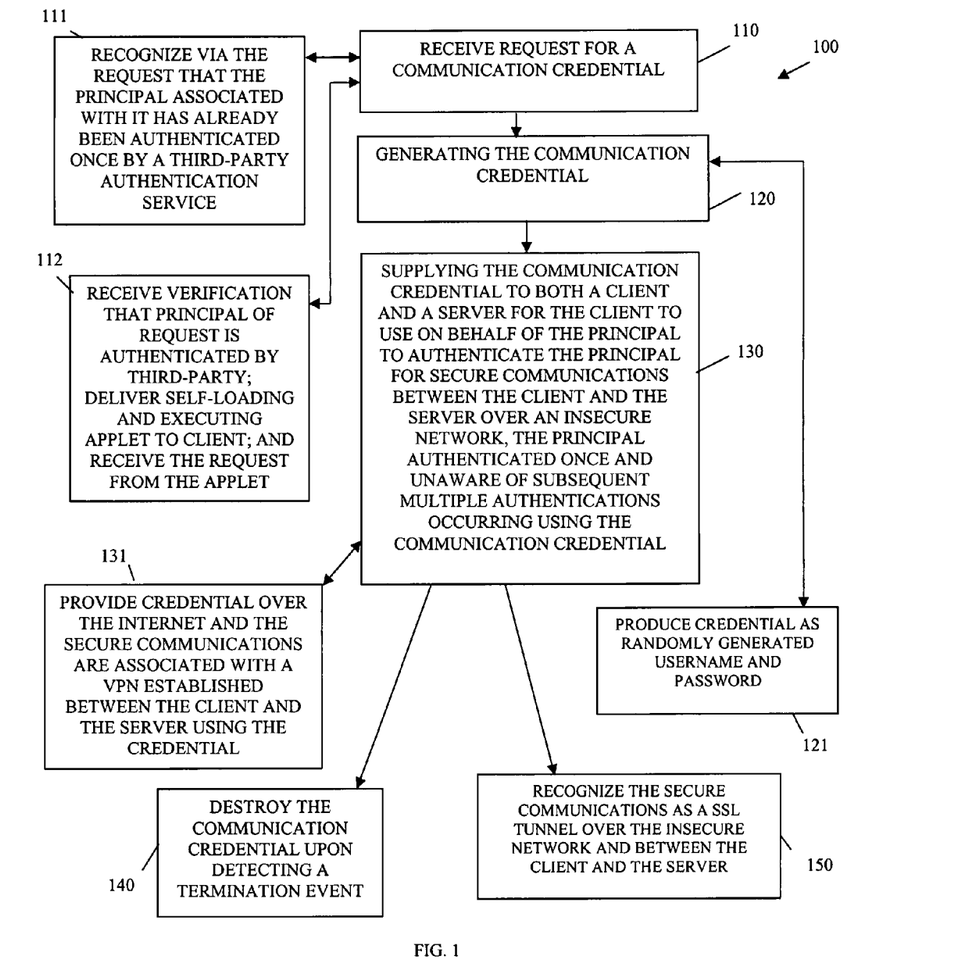
FIG. 1 is a diagram of a method for a secure communications credentialing service, according to an example embodiment.

FIG. 1 is a diagram of a method 100 for a secure communications credentialing service, according to an example embodiment. The method 100 (hereinafter "credentialing facilitation service") is implemented as instructions in a machine-accessible and readable medium. The instructions when executed by a machine perform the processing depicted in FIG. 1. The credentialing facilitation service is also operational over and processes within a network. The network may be wired, wireless, or a combination of wired and wireless.

At 110, the credentialing facilitation service receives a request for a communication credential. The communication credential may be viewed as a secret that is to be shared between the client and the server and that is used to establish and maintain secure communications between the client and the server once a principal has been authenticated once (single sign-on) to the server. In an embodiment, the client is a SSL VPN client and the server is a SSL VPN client that utilize two tier authentication techniques.

Accordingly, in an embodiment at 111, the credentialing facilitation service may recognize that the request is for the principal and that a third-party authentication service has already authenticated the principal. In other words, a third-party authentication service may obtain the principal's specific credentials and authenticate the principal. Next, the third-party authentication service informs the credentialing facilitation service that authentication has been achieved for the principal. Once way to achieve this is through browser and Uniform Resource Locator (URL) redirection within a browser. A specific interaction scenario is presented below in greater detail with reference to the FIG. 5.

In another case, at 112, the credentialing facilitation service may determine based on prior interaction with a third-party authentication service that a particular requesting principal is in fact authenticated for access to the server. The principal has achieved single sign-on from the perspective of the principal. Once the credentialing facilitation service is assured that this is the case via interaction with the third-party authentication service, the credentialing facilitation service delivers a self-loading and self-executing applet to the client of the principal, or mare particularly to a browser processing on the client of the principal. The applet once initiated makes the request that the credentialing facilitation service receives at 110 for the communication credential. Again, a sample interaction scenario is presented in greater detail below with reference to the FIG. 5.

At 120, the credentialing facilitation service generates the communication credential. In an embodiment, at 121, the communication credential is produced as a randomly generated number tuple. One component of the tuple is a valid username or principal identifier and another component of the tuple is a valid password to use in connection with the username. It is understood that other techniques may be used as well. The point is that a secret credential is generated in response to a principal that is known to be authenticated. The use of this credential is discussed in greater detail below.

At 130, the credentialing facilitation service supplies the communication credential to both a SSL VPN client and a SSL VPN server. Services on the client uses the communication credential on behalf of the principal to authenticate the principal or the client for secure communications between the client and the server over an insecure network, such as the Internet. From the perspective of the principal, the principal has authenticated just once when the principal interacted with the third-party authentication service and from that point forward the principal is unaware that subsequent authentications may be occurring between the client and the server to establish and maintain secure communications. The credential permits the client or services of the client to authenticate for secure communications and since the server and its services have also received the credential, the server can validate the communications and engage safely in the communications with the client. A sample implementation for achieving this in greater detail is presented below with reference to the FIG. 5.

In an embodiment, at 131, the credentialing facilitation service may provide the credential over the Internet to both the SSL VPN client and the SSL VPN server using Hypertext Transfer Protocol over Secure Sockets Layer (HTTPS) communications. Moreover, the credential is used by the SSL VPN client and the SSL VPN server to engage in Virtual Private Network (VPN) communications with one another.

At some point in time, at 140, the credentialing facilitation service may detect a termination event. This may be raised as a result of policy evaluation, manual intervention, or automatic event detection. In such a situation, the credentialing facilitation service can revoke or destroy the credential, such that its use becomes invalid. Again, policy or profiles may determine the length for which a credential remains valid or the events for which the credential is to be destroyed.

In another embodiment, at 150, the credentialing facilitation service recognizes the secure communications that occur between the SSL VPN client and the SSL VPN server as Secure Sockets Layer (SSL) VPN tunnel between the SSL VPN client and the SSL VPN server over an insecure public network, such as the Internet, insecure wireless network, etc.

The credentialing facilitation service acts as an intermediary between the SSL VPN client and a SSL VPN server over a network. The purpose of mediation is for the SSL VPN client and SSL VPN server to securely acquire a secrete communication credential that the two can use unbeknownst to the principal of the SSL VPN client to facilitate a view from the perspective of the principal that the principal has signed into the SSL VPN server once, via authentication to the third-party authentication service, and can seamless engage in secure communications with the SSL VPN server over an insecure network. The details of performing multiple authentications between the SSL VPN client and the SSL VPN server when session identifiers are confused, etc. are managed by the SSL VPN client using the credential. This processing is discussed with reference to the method 200 of the FIG. 2.

Figure 2:
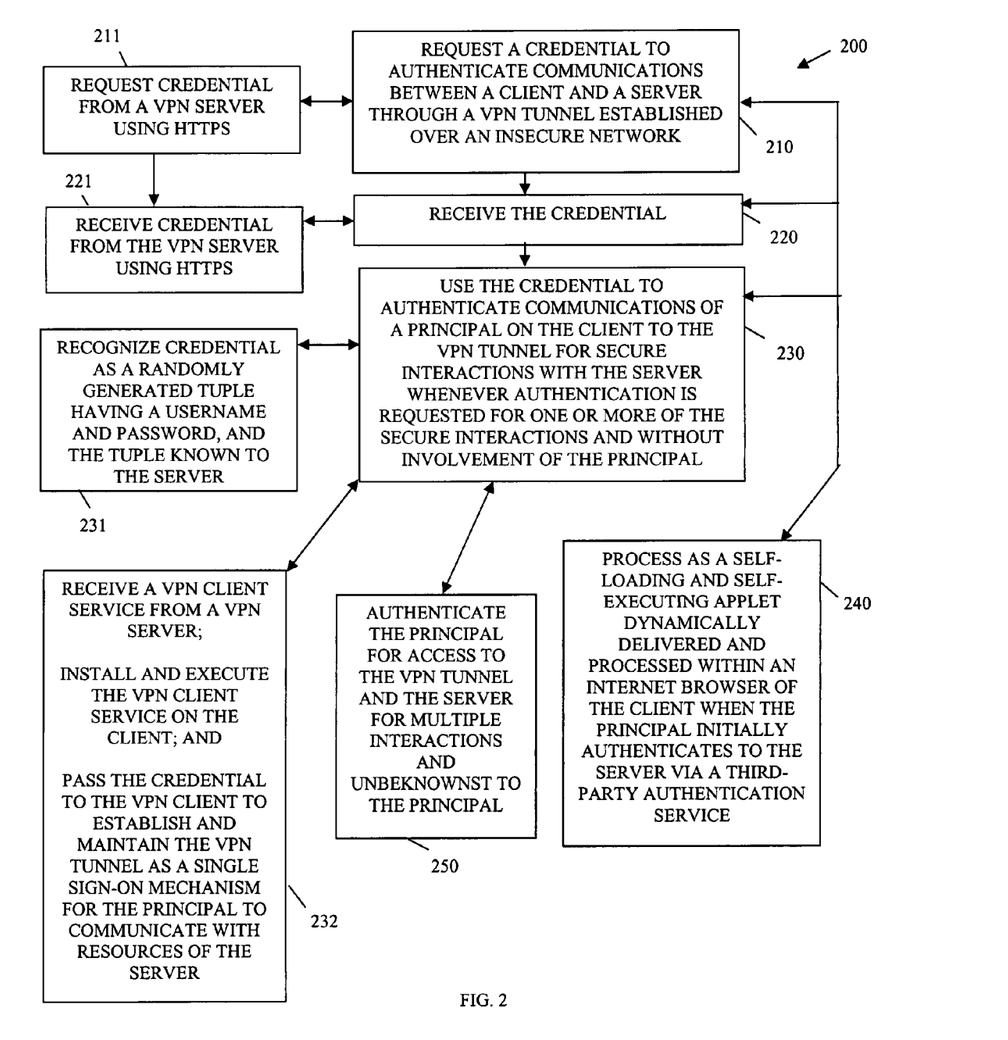
FIG. 2 is a diagram of method for a secure communications tunneling service, according to an example embodiment.

FIG. 2 is a diagram of method 200 for a secure communications tunneling service, according to an example embodiment. The method 200 (hereinafter "tunneling facilitation service" is implemented in a machine-accessible and readable medium as instructions. The instructions when executed by a machine perform the processing depicted in the FIG. 2. Moreover, the tunneling facilitation service is operational over a network, and the network may be wired, wireless, or a combination of wired and wireless.

The tunneling facilitation service communicates with the credentialing facilitation service represented by the method 100 of the FIG. 1 to assist in provide transparent secure communications between a SSL VPN client and SSL VPN server unbeknownst to a benefiting principal.

At 210, the tunneling facilitation service requests a credential to authenticate communications between a SSL VPN client and a SSL VPN server via a VPN tunnel established over an insecure network, such as the Internet, etc. In an embodiment, at 211, the tunneling facilitation service requests the credential from a VPN server using HTTPS communications. In an embodiment, the VPN server is the credentialing facilitation service discussed above with reference to the method 100 of the FIG. 1.

At 211, the tunneling facilitation service receives the credential in response to the request made of the VPN server. As was the case at 211, and is again, at 221, the tunneling facilitation service may receive that credential over an insecure network via HTTPS communications.

At this point, the tunneling facilitation service is equipped with the credential to establish and manage the VPN tunnel between the SSL VPN client and the SSL VPN server on behalf of a principal.

Accordingly, at 230, the tunneling facilitation service uses the credential to authenticate communications of a principal on the SSL VPN client to the VPN tunnel over the Internet and to the server. This permits secure interactions between the SSL VPN client and the SSL VPN server. Moreover, the tunneling facilitation service can use the credentials to re-authenticate whenever there is doubt or whenever it is needed to maintain or re-establish the VPN tunnel communications with the server. This occurs without the involvement, knowledge, and unbeknownst to the principal. Example interactions for achieving this in a specific implementation are provided below in greater detail with reference to the FIG. 5.

In an embodiment, at 231, the tunneling facilitation service may recognize the credential as a randomly generated tuple represented as a username and password combination that is also known by the SSL VPN server. Discussion as to how this is generated and how it is supplied to the SSL VPN server was discussed above with reference to the credentialing facilitation service represented by the method 100 of the FIG. 1.

In one example situation (which is detailed more completely below with reference to the FIG. 5), at 232, the tunneling facilitation service receives a VPN client service from a VPN server (such as from the credentialing facilitation service represented by the method 100 of the FIG. 1). The VPN client service manages and maintains the VPN tunnel and manages performing the authentications when needed in a fashion that is unknown to the principal. The tunneling facilitation service also installs and executes or initiates the VPN client service on the client after it is received and passes the credential to the VPN client service.

According to an embodiment, at 240, the tunneling facilitation service may be processed as a self-loading and self-executing applet, such as a JAVA applet. The applet is dynamically delivered and processed within a browser of the client when the principal is initially authenticated by the third-party authentication service. In this case, the applet then loads other components such as what was described at 232 to configure and arrange the client for establishing and maintaining the VPN tunnel between the SSL VPN client and the SSL VPN server. Again, all this is achieved without any knowledge or involvement of the principal (e.g. user). From the perspective of the user, the user has signed in just once to the server via the third-party authentication service.

So, at 250, the tunneling facilitation service permits the principal to be authenticated for access to the VPN tunnel for multiple interactions and re-authenticated as necessary and all unbeknownst to the principal.

The credentialing facilitation service of the method 100 detailed how credentials are generated and distributed to a SSL VPN client and SSL VPN server that desire to have principal single sign-on via secure communications for an insecure network. The tunneling facilitation service detailed how the SSL VPN client components can make this happen for the principal.

Figure 3:
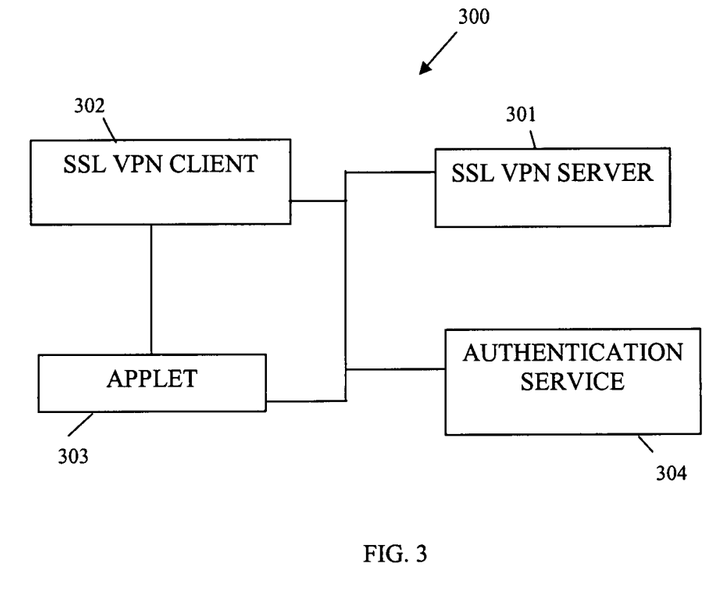
FIG. 3 is a diagram of a secure communications system, according to an example embodiment.

FIG. 3 is a diagram of a secure communications system 300, according to an example embodiment. The secure communications system 300 is implemented as instructions on or within a machine-accessible and readable medium. The instructions when executed by one or more machines perform the processing depicted in the methods 100 and 200 of the FIGS. 1 and 2, respectively. The secure communications system 300 is operational over a network that may be wired, wireless, or a combination of wired and wireless.

The secure communications system 300 a SSL VPN server 301 and a SSL VPN client 302. In some embodiments, the secure communications system 300 may also include an applet 303 and/or an authentication service 304. Each of these and there interactions with one another will now be discussed in turn.

The SSL VPN server 301 is implemented in a machine-accessible and readable medium and is to process on a server machine (processing device). Example processing and features of a SSL VPN server 301 was provided in detail above with reference to the credentialing facilitation service represented by the method 100 of the FIG. 1.

The SSL VPN server 301 is to communicate securely with the SSL VPN client 302 over an insecure network, such as via HTTPS. Additionally, the SSL VPN sever 301 randomly generates a user name and password tuple on behalf of a known and previously authenticated principal. That tuple is passed to both client and a server over the insecure network using secure communications, such as HTTPS. Policy and events may also drive when the SSL VPN server 301 destroys the tuple, such as when some termination event is detected by the SSL VPN server 301.

The principal desires or seeks to communicate from the client to resources of the server over the insecure network, such as the Internet, in a secure fashion, such as via a VPN tunnel. However, the principal does not have to perform multiple authentications to make this happen and to maintain the VPN tunnel; rather, the SSL VPN client 302 and the SSL VPN server 301 cooperate to make this happen. This specific interaction was described in detail above with reference to the FIGS. 1 and 2 and a specific implementation is presented below with reference to the FIG. 5.

The SSL VPN client 302 is implemented in a machine-accessible and readable medium and is to process on a client machine (processing device). Some example processing and some features of a SSL VPN client 302 were provided in detail above with reference to the tunneling facilitation service represented by the method 200 of the FIG. 2.

The SSL VPN client 302 uses the tuple supplied from the SSL VPN server 301 to authenticate the principal to the server for access to a secure VPN tunnel established and maintained between the client and the server over the insecure network, such as the Internet. The principal is entirely unaware of the tuple or the actions of the SSL VPN server 301 and the SSL VPN client 302. Again, from the perspective of the principal there is but one authentication and sign in to the server. Thus, whenever the VPN tunnel requires re-authentication or is lost, the SSL VPN client 302 can re-establish it o re-authenticate without involvement of the principal via the tuple. The server on the other end of the VPN tunnel also has the tuple and can validate it. Thus, secure and seamless secure communications continue unabated and without principal involvement.

According to an embodiment, the secure communications system 300 may also include an applet 303. The applet 303 is implemented in a machine-accessible and readable medium and is to process on a client machine or within a client browser processing on the client machine. The applet is self-loading and self-executing, such as a JAVA applet, etc. Some aspects of the method 200 may be viewed as the applet. The applet when executed requests the SSL VPN client 302 from the SSL VPN server 301. Thus, the SSL VPN server 301 may deliver the SSL VPN client 302 dynamically and in real time to the client and the applet can install and execute the SSL VPN client 302. Example processing to achieve this is described in greater detail below with reference to the FIG. 5.

In an embodiment, the secure communications system 300 includes an authentication service 304. The authentication service 304 is implemented in a machine-accessible and readable medium and is to process on a machine that can be different from the client machine and the server machine but does not have to be in every situation or architectural arrangement. Moreover, in an embodiment, the authentication service 304 is an identity service, such as an identity service identified and incorporated by reference herein above.

The authentication service 304 is used to initially authenticate the principal. That is, the principal believes it signs into the server via the authentication service 304 once. From that point forward any authentication that may be needed to establish or re-establish the secure VPN tunnel is handled by the SSL VPN client 302 using the tuple and by the server on the other end of the tunnel using the same tuple to verify authentication of the principal.

Figure 4:
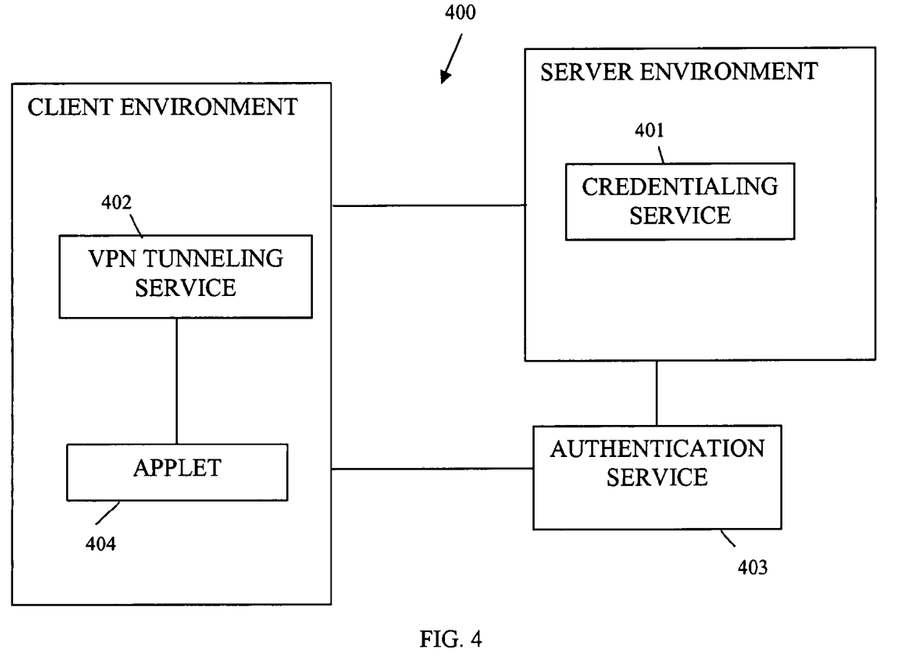
FIG. 4 is a diagram another secure communications system, according to an example embodiment.

FIG. 4 is a diagram another secure communications system 400, according to an example embodiment. The secure communications system 400 is implemented as instructions on or within a machine-accessible and readable medium. The instructions when executed by one or more machines perform enhanced processing depicted with respect to the methods 100 and 200 of the FIGS. 1 and 2, respectively. The secure communications system 400 is also operational over a network, and the network may be wired, wireless, or a combination of wired and wireless.

The secure communications system 400 presents an alternative view and perspective to the secure communications system 300 of the FIG. 3.

The secure communications system 400 includes a credentialing service 401 and a VPN tunneling service 402. In some cases, the secure communications system 400 may also include an authentication service 403 and an applet 404. Each of these and their interactions with one another will now be discussed in turn.

The credentialing service 401 is implemented in a machine-accessible and readable medium and is to process on a server machine. Example processing associated with the credentialing service is presented above with reference to the method 100 of the FIG. 1 and the VPN server 301 of the system 300.

The credentialing service 401 resides within a server environment. The credentialing service is to generate and distribute a randomly generated credential. The credential is used for maintaining and authenticating to a secure VPN for a client to a server over an insecure network, such as the Internet. The credential is supplied on behalf of a previously authenticated principal. The principal is unaware of the credential and the usage of the credential. The credentialing service 401 supplies the credential to both the client and a server. The client may include a variety of services, such as the VPN tunneling service 402.

The VPN tunneling service 402 is implemented in a machine-accessible and readable medium and is to process on a client machine. Some example features associated with the VPN tunneling service 402 may be found above with reference to the method 200 of the FIG. 2 and the VPN client 302 of the system 300. The VPN tunneling service 402 uses the randomly generated credential to authenticate the principal on the client machine to the server machine by establishing a VPN tunnel over an insecure network for the principal and resources of the server to communicate. The principal is unaware of the randomly generated credential and the VPN tunneling service 402.

According to an embodiment, the secure communications system 400 may also include an authentication service 403 implemented within a machine-accessible and readable medium and to process on the client machine, the server machine, or an entirely independent machine of the network. The authentication service 403 does not have to reside on a machine that is within the server environment or server environment, as depicted in the FIG. 4. The authentication service 403 is to provide single sign-on to the principal for access to the server machine by initially authenticating the principal with principal supplied and specific credentials. In an embodiment, the authentication service 403 is an identity service, such as the identity services described and incorporated by reference herein and above.

In an embodiment, the secure communications system 400 may also include an applet 404 implemented within a machine-accessible and readable medium and to process on a client machine or within a browser that processes on the client machine. The applet 404 resides within the client environment and is dynamically loaded and executed within a browser of the client machine when the principal successfully authenticates to the server machine a first time. In some cases, the applet is used to dynamically and in real time acquire the VPN tunneling service 402 from the credentialing service 401 and then install and initiate the VPN tunneling service 402 on the client machine.

Figure 5:
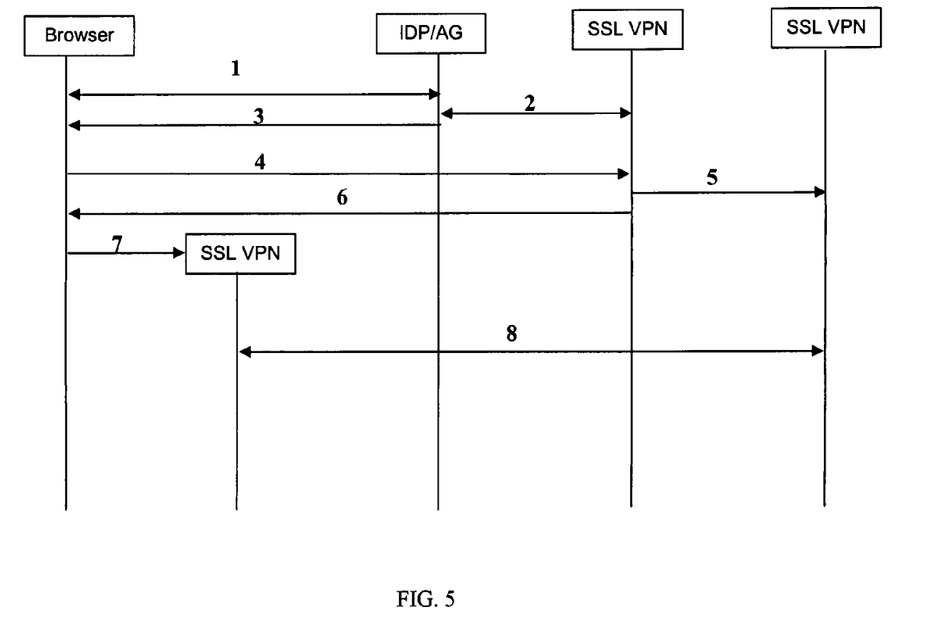
FIG. 5 is a diagram of an example architecture and example component interactions for that architecture to achieve single sign-on functionality for secure communications over an insecure network, according to an example embodiment.

FIG. 5 is a diagram of an example architecture and example component interactions for that architecture to achieve single sign-on functionality for secure communications over an insecure network, according to an example embodiment. It is noted that the components and arrangement or components is presented for purposes of illustration only and is not intended to limit the teachings herein to the particular architecture illustrated in the FIG. 5.

The architecture of the FIG. 5 illustrates a variety of components, such as a browser, a Secure Sockets Layer (SSL) VPN Client, a dual Identity Provider (labeled as IDP) and Access Gateway (labeled as AG), a SSL VPN Webserver, and an SSL VPN Server. An example serial communication is labeled via arrows 1-8. Each of these will now be discussed in turn.

In 1, a principal (e.g., user) access a Uniform Resource Locator (URL) embedded link within a web page from the client machine's browser. The URL may have been supplied via an administrator. The activation of the URL is accelerated by an Access Gateway (AG). Initially, the Hypertext Transfer Protocol (HTTP) session is not authenticated, so the URL request is redirected to the IDP for user authentication. This results in a form being displayed in the browser to collect user credential information. The user then enters credentials into the form and submits them back to the IDP for authentication.

In 2, the IDP authenticates the user and after authentication forwards the original URL request to the SSLVPN Webserver. The SSL VPN Webserver sends a Hypertext Markup Language (HTML) page, which has a JAVA applet embedded within it and which can self-load and self-execute within the browser of the user on the client machine.

In 3, the AG forwards the HTML page as a response to the original URL request made by the user to the browser, where the applet is loaded, initiated, and executed within the browser.

In 4, the applet, now processing within the browser, requests the SSLVPN Webserver to assist in further providing additional SSL VPN client components and a shared secret (random number) tuple that is used by the SSL VPN Client components. This communication happens over HTTPS (Hypertext Transfer Protocol over Secure Sockets Layer).

In 5, the SSL VPN Webserver generates a unique random number tuple and passes it on to the back-end SSL VPN Server. The SSL VPN Server was the object of the user's original URL request. The user achieved single sign-on from the perspective of the user when the user authenticated the first time to the IDP.

In 6, the SSL VPN Webserver replies to the applet with the same random number tuple along with the other SSL VPN Client components.

In 7, the applet installs the SSL VPN Client in real time ("on-the-fly") and dynamically within the user's client machine and passes the random number tuple to be used for further authentication by the SSL VPN Client to the SSL VPN Server.

In 8 and later when an application of the user is accessing the private/protected network of the SSL VPN Server, the SSL VPN Client starts to build the SSL VPN tunnel between the client machine and the SSL VPN Server. This tunnel can be built in a number of manners. For example, a socks protocol can be used for establishment of the connection and the connection can be diverted over an SSL connection so that traffic on this particular socks connection is encrypted. For socks negotiation to happen, the socks client authenticates itself to the socks server. The random number tuple is used as the username and password for this authentication. The socks server on the SSL VPN Server was previously notified of this username and password in 5; so, authentication is successfully achieved.

Thus, in 5, 6, and 8 the generated random number tuple can be used by the socks protocol while the SSL VPN Client and Server are establishing an SSL VPN tunnel with one another and since the user is only aware of a single authentication that occurred in 1 and 2, a single sign-on mechanism is achieved for secure communications over an insecure network (the Internet in this example).

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by a credentialing service, verification that a principal has been authenticated by a third-part authentication service;
delivering, by the credentialing service, a self-loading and self-executing applet to the principal;
receiving, by the credentialing service, a request for a communication credential from the applet;
generating, by the credentialing service, the communication credential as a random number tuple representing a user name and password combination for the principal; and
supplying, by the credentialing service, the communication credential to a Virtual Private Network (VPN) client, initiated by the applet on the principal, and to a VPN server, the communication credential used by the VPN client to establish a VPN session between the VPN client and the VPN server instead of requiring the principal to separately log into the VPN server, and further used to re-authenticate the VPN session without requiring the principal to separately log into the VPN server, wherein the VPN client is a Secure Socket Layer (SSL) client and the VPN server is a SSL server that utilize two-tier authentication techniques.

2. The method of claim 1, wherein supplying further includes, providing the communication credential over the Internet, wherein the insecure network connection is an Internet connection.

3. The method of claim 1 further comprising, destroying the communication credential upon detecting a termination event.

4. A method, comprising:
requesting, by a client machine for a principal, a credential from a credentialing service to authenticate communications between a Virtual Private Network (VPN) client on the client machine and VPN server through a VPN tunnel that is to be established over an insecure network connection, the credential being generated by the credentialing service after receiving verification that the principal has been authenticated by a third-party authentication service, and the credentialing service separately supplying the credential to the VPN server in advance of any authentication by the VPN client;
receiving, by the client machine, a self-loading and self-executing applet that is dynamically delivered to and processes within an Internet browser of the client machine when the principal initially authenticates to the server via the third-party authentication service, the applet initiating the VPN client;
receiving, by the applet on the client machine, the credential as a random number tuple representing a valid user name and password combination for the principal in response to a request for the tuple by the applet; and
using, by the VPN client, the credential to authenticate communications of the principal to establish the VPN tunnel for secure interactions with the VPN server instead of requiring the principal to separately log into the VPN server, the credential further used to re-authenticate the VPN tunnel whenever authentication is requested for one or more of the secure interactions without requiring the principal to separately log into the VPN server, wherein the VPN client is a Secure Socket Layer (SSL) client and the VPN server is a SSL server that utilize two-tier authentication techniques.

5. The method of claim 4, wherein requesting further includes requesting the credential from the credentialing service using Hypertext Transfer Protocol over a Secure Sockets Layer (HTTPS).

6. The method of claim 5, wherein receiving further includes receiving the credential from the credentialing service using HTTPS.

7. The method of claim 4, further comprising:
receiving the VPN client from the VPN server;
installing and executing the VPN client on the client machine; and
passing the credential to the VPN client to establish and maintain the VPN tunnel.

8. A system, comprising:
a Virtual Private Network (VPN) server implemented in a machine accessible medium and to process on a server machine;
a VPN client implemented in a machine accessible medium and to process on a client machine for a principal; and
an applet implemented in a machine accessible and readable medium and to be delivered from the VPN server to the client machine, wherein the applet is self-loaded and self-executed within a browser to acquire and initiate the VPN client from the VPN server over the insecure network using secure communications,
wherein the VPN server is to communicate securely with the VPN client over an insecure network, and is to randomly generate a random number tuple for a user name and password combination for a principal, in response to an initial request for the tuple from the applet, after a credentialing service receives verification that the principal has been authenticated by a third party authentication service, and
wherein the VPN client is to subsequently use the tuple to authenticate the principal to the VPN server for access to a secure VPN tunnel between the VPN client and the VPN server over the insecure network without requiring the principal to separately log into the VPN server, the tuple further being used to re-authenticate the VPN tunnel without requiring the principal to separately log into the VPN server, and
wherein the VPN client is an Secure Socket Layer (SSL) client and the VPN server is a SSL server that utilize a two-tier authentication technique.

9. The system of claim 8 further comprising, the authentication service implemented in a machine accessible and readable medium and to process on a machine, wherein the authentication service is to authenticate the principal using principal acquired credentials and is to further inform or indicate to the VPN server that the principal is authenticated.

10. The system of claim 8, wherein the VPN server is to destroy the tuple on detection of a termination event.

* * * * *